April 16, 1935. J. M. RUSNAK 1,997,916
ADJUSTABLE WORK CLAMPING DEVICE
Filed June 13, 1933 2 Sheets-Sheet 1
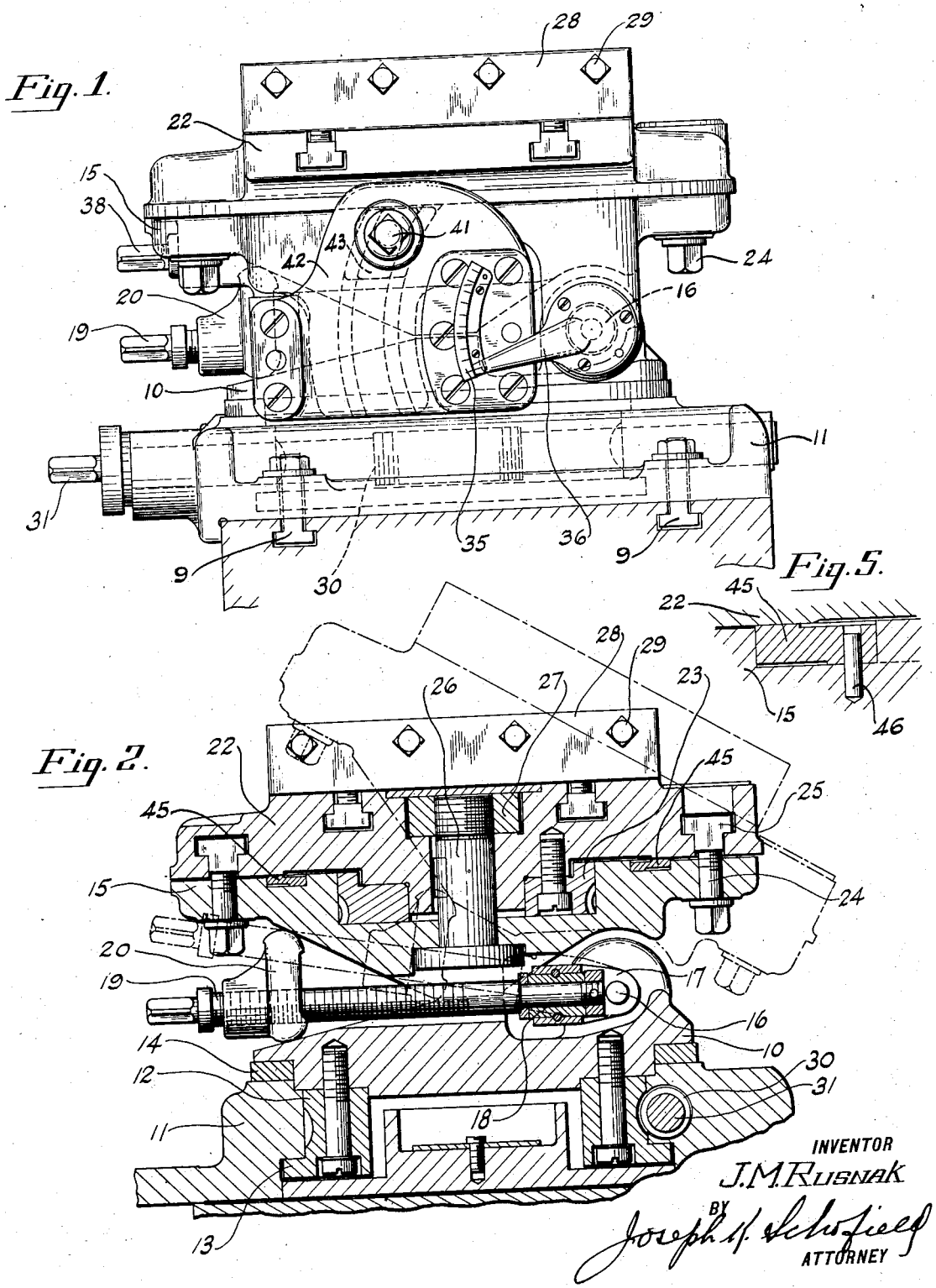

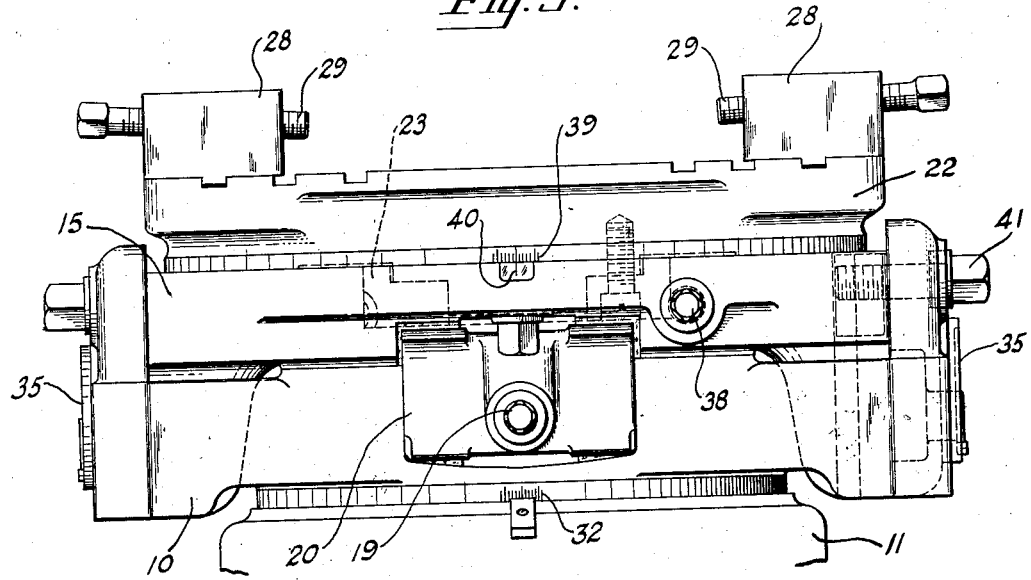
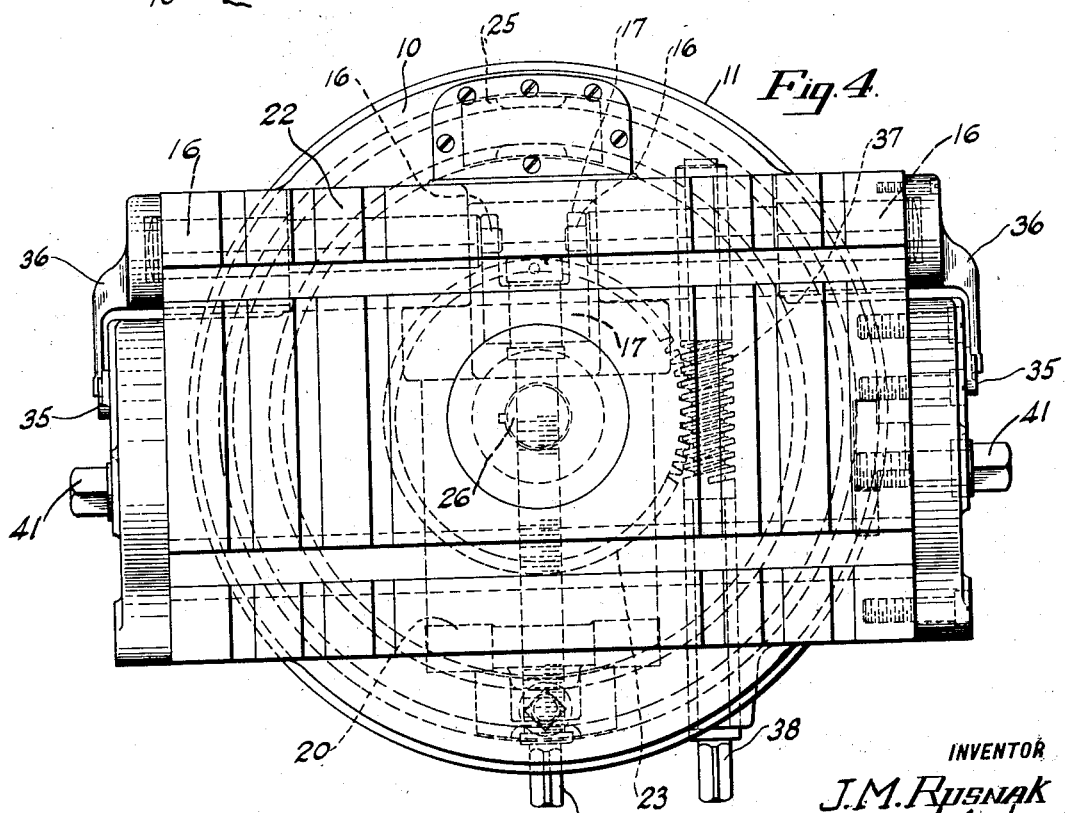

Patented Apr. 16, 1935

1,997,916

UNITED STATES PATENT OFFICE 1,997,916

ADJUSTABLE WORK CLAMPING DEVICE

John M. Rusnak, West Hartford, Conn., assignor to Pratt & Whitney Company, Hartford, Conn., a corporation of New Jersey Application June 13, 1933, Serial No. 675,596

2 Claims. (Cl. 90—58)

This invention relates to work supporting and clamping means particularly adapted for mounting work pieces for operation in different oblique and rotary positions in a milling or die sinking machine.

An object of the present invention is to provide means for mounting work pieces in machine tools so that they may be tilted to different angles and adjusted to different rotated positions while in any tilted position, this object being accomplished by a rotatable work clamping member supported in a pivotally mounted member which in turn is rotatable within a fixed base or support.

Another object of the invention is to provide a rotatable member for angular adjustment of a pivotally mounted member in a horizontal plane, the pivotal member having means to adjust it about a horizontal axis to varying oblique angles and carrying a rotatable work clamping member upon its upper surface.

A feature of the construction whereby the above objects are accomplished is that a rotatable member preferably supported directly in a fixed base or a vertically adjustable support is provided with worm and worm wheel rotating means whereby the complete fixture or work support may be rotated about a vertical axis. Supported on this rotatable member upon a horizontal axis is a second member which may be pivoted about the horizontal axis to any oblique or to a vertical position. This second or pivotal member in turn supports a rotatable member which may be angularly adjusted about an axis normal to the horizontal axis of the pivotal member by means of a worm and worm wheel construction. By these means work clamped within the second rotatable member may be adjusted to any rotatable position in a plane which plane is adjustable about an axis which in turn is also rotatably adjustable to any rotary position.

With the above and other objects in view, my invention includes the features of construction and operation set forth in the following specification and illustrated in the accompanying drawings.

In the accompanying drawings annexed hereto and forming a part of this specification, I have shown my invention embodied in an angularly and rotatably adjustable work supporting member for a vertical milling or die sinking machine, but it will be understood that the invention can be otherwise embodied and that the drawings are not to be construed as defining or limiting the scope of the invention, the claims appended to this specification being relied upon for that purpose.

In the drawings:

Figure 1 is a side elevation of the complete work support with its work clamping member in its lowermost position.

Fig. 2 is a vertical sectional view showing the interior construction of the support and indicating in dotted lines an oblique position to which the pivotal member may be adjusted.

Fig. 3 is a front elevation of the complete support with the work supporting member in its lowermost position.

Fig. 4 is a plan view of the complete work support, and

Fig. 5 is a sectional view of a detail.

In the above mentioned drawings I have shown but one embodiment of the invention which is now deemed preferable, but it is to be understood that changes and modifications may be made within the scope of the appended claims without departing from the spirit of the invention.

Briefly and in its preferred aspect, my invention may include the following principal parts: First, a member rotatable about a vertical axis within a fixed supporting member forming part of a machine tool; second, a member pivotally mounted on the first member preferably upon a horizontal axis; third, adjusting means for varying the angular position of the pivotal member; fourth, a rotatable member mounted within the pivotal member; fifth, work clamping means upon the second rotatable member; and sixth, means to adjust the rotative position of each of the rotatable members.

Referring more in detail to the figures of the drawings, I provide a member 10 preferably supported upon a supporting member 11 forming part of a table or base of the machine tool on which the work clamping means are adapted to be used. In order to retain this member 10 in position for rotary movement there is provided a worm wheel 12, preferably of ring form, secured as by screws to the under face of the member 10 and contacting with a cylindrical recessed portion of the supporting member 11. An outstanding flange 13 on the lower edge of the worm gear retains the member 10 in its position upon the support 11. Preferably a ring bearing member 14 is provided between the rotatable member 10 and its support 11 upon which the weight of the assembled members may bear. Clamping screws 9 may be used as shown in Fig. 1 to retain the supporting member 11 rigidly in position upon a portion of the machine tool to which the present invention may be attached.

Mounted transversely and horizontally within the rotatable member 10 and a member 15 are two short shafts 16 pivotally connecting members 10 and 15 together. The shafts 16 are in alinement with each other and each shaft passes through suitable openings within the members 10 and 15, the openings within one of the members permitting rotation of the shaft therein. These shafts 16 have mounted between their inner ends a yoke member 17 within which is provided a bearing 18 for the inward end of an adjusting screw 19. The yoke 17 and screw 19 are adapted to be oscillated to varying oblique positions and, by rotation of the screw 19 within its bearing 18, a nut or wedge 20 is moved toward or from the axis of the yoke 17. The lower portion of the nut or wedge 20 rides upon an oblique surface formed on the rotatable member 10 and the upper edge rides upon a surface of the pivotal member 15 which is pivoted upon the same axis as the yoke. It will be seen from the above construction that by rotating the screw 19 and thus moving the nut or wedge 20 toward or from the axis about which member 15 is pivotally mounted this pivotally mounted member 15 will be oscillated to varying oblique angles depending upon the position of the wedge 20 along the screw 19. In order to rotate the screw 19 its forward end is squared to accommodate a wrench.

Upon the upper surface of the pivotal member 15 is mounted a second rotatable member 22, a worm wheel 23 being secured as shown to its lower surface and adapted to enter a cylindrical recess within the pivotal member 15. Clamping screws 24 are provided to secure this member 22 in adjusted position operating within openings within the member 15 and having nuts 25 on their upper ends slidable within an annular groove extending completely around the second rotatable member 22. Preferably and as shown, there is a central pin or stud 26 engaging the under face of the pivotal member 15 and keyed within a vertical central opening within the second rotatable member 22. A nut 27 on the upper end of this stud or pin 26 retains the rotatable member 22 within the pivotal member 15 and permits rotation thereof when the clamping screws 24 are released.

Provided on the upper surface of this second rotatable member 22 are work clamping means of conventional or standard type. As shown, these include opposed abutments 28 which may be positioned at spaced points upon the surface of the rotatable member 22 so that pieces may be clamped between adjacent faces by clamping screws 28.

In order to adjust the lower rotatable member 10 relative to its support 11 to any rotative position, a worm 30 is provided on a shaft 31 extending forwardly through the support 11 for the work clamping means, the worm 30 engaging worm wheel 12. To indicate the position to which the member 10 is adjusted, a circular series of graduations 32 may be provided thereon extending about the complete circumference of the member 10. Adjacent these graduations is a zero indicator 33 on the support 11. In order to indicate the angular adjustment of the pivotal member as it is tilted to different oblique positions, an arcuate scale 35 is provided on a member fixed to the rotatable member 10 adjacent a pointer 36 formed on a member secured rigidly to a side face of the pivotal member 15. Also the second or upper rotatable member 22 may be rotated upon the pivotal member 15 to indicated angular positions as by means of the worm 37 engaging the worm wheel 23 referred to above. By means of a forwardly extending shaft 38 on which the worm 37 is formed the member 22 may be rotated to any desired position. In order to indicate the positions to which the second rotatable member 22 is adjusted, its periphery may be provided with a circular series of graduations 39 extending completely about its periphery. These graduations are closely adjacent a zero line 40 on the forward portion of the pivotal member 15.

From the above description it will be seen that a work piece (not shown) positioned within the work clamping members 28 may be rotated to any angular or rotative position by means of either of the rotatable members 10 or 22, and that by rotating the lower rotatable member 10 the axis about which the pivotal member 15 is mounted may be moved to any desired position in a horizontal plane. By these combined means a work piece may be positioned so that it may have a series of parallel holes drilled therein at any oblique angle and in any direction or the work piece may be provided with a plurality of oblique holes having a common point of intersection. The work piece may be moved so that it may be in any rotated position in any oblique position up to an angle of 45° and with its axis of oscillation in any rotated position in a fixed plane.

Clamping means for the pivotal member 15 are provided on opposite sides of the member 15 these preferably being clamping screws 41 extending through the plate-like members 42 secured to opposite sides of the member 10. Nuts 43 on these screws 42 engage with arcuate slots formed within the pivotal member 15.

As the member 22 is clamped and unclamped relative to the pivotal member 15 an annular bearing strip is employed as shown in Fig. 5. This strip 45 may be pinned in position within the pivotal member 15 by one or more pins 46. As shown in Fig. 2, the outer portion of the lower surface of the strip and the inner portion of the upper surface are slightly cut away. The result, therefore, is that the member 22 is at all times held resiliently slightly away from the member 15. When the clamping screws 24 are loosened the member 22 may be freely rotated. Clamping the member 22 to the member 15 draws down the member 22 closer to but not into direct contact with member 15. Upon loosening the screws 24 the member 22 springs back to its normal free position and permits free rotation by means of the worm 37 and worm wheel 23. By this means the member 22 is prevented from tightly engaging the pivotal member 15 and becoming locked thereto. By means also of this resilient bearing strip 45 distortions of the member 22 due to the clamping of blocks between the abutments 28 on this member do not cause member 22 to become tightly bound to the pivotal member 15.

What I claim is:

1. A work clamping device for milling machines comprising in combination, a rotatable member adapted to be supported on said machine, means to rotate said member to any angular position, a member pivotally mounted thereon upon an axis normal to the axis of rotation of said first member, means to adjust said pivotal member to different desired oblique positions, said means including a screw rotatably mounted and a wedge thereon contacting with opposed surfaces of said first member and said pivotal member, a rotatable member on said pivotally mounted member, an annular resilient bearing member interposed between and having annular bearing surfaces contacting with said pivotal member and the rotatable member thereon, means to rotate said member to any angular position, means adjacent said bearing member to clamp said pivotal member and the rotatable member thereon in any rotative position, and work clamping means on said last mentioned rotatable member.

2. A work clamping device for milling machines comprising in combination, a member adapted to be mounted for rotation about a fixed axis upon the work support of a milling machine, a member pivoted thereto upon an axis in a plane normal to said first axis, a second rotatable member mounted in said pivotal member, a resilient annular bearing member disposed between said pivotal member and the rotatable member thereon and having annular bearing surfaces in contact with said pivotal and rotatable members, work clamping means on said second rotatable member adjacent said resilient bearing member and compressing said bearing member when clamped, means to adjust the pivotally mounted member about its axis, said means including an adjusting screw and wedge threaded thereon whereby rotation of said screw moves said wedge between opposed surfaces respectively of said first rotatable member and said pivotal member, and means to lock said pivotal member in oblique position.

JOHN M. RUSNAK.